United States Patent
Odaibo (10) Patent No.: US 12,451,216 B2
(45) Date of Patent: Oct. 21, 2025

(54) RECURSIVE TRANSFORMERS FOR AI-BASED PROTEIN-PROTEIN INTERACTION AND DRUG DESIGN

(71) Applicant: Stephen Gbejule Odaibo, Sugar Land, TX (US)

(72) Inventor: Stephen Gbejule Odaibo, Sugar Land, TX (US)

(73) Assignee: Deep EigenMatics LLC, Sugar Land, TX (US)

( * ) Notice: Subject to any disclaimer, the term of this patent is extended or adjusted under 35 U.S.C. 154(b) by 0 days.

(21) Appl. No.: 19/175,905

(22) Filed: Apr. 10, 2025

(65) Prior Publication Data
US 2025/0239330 A1    Jul. 24, 2025

(51) Int. Cl.
*G16B 40/20*    (2019.01)
*G06N 3/0455*   (2023.01)
*G16B 15/30*    (2019.01)
*G16B 40/30*    (2019.01)

(52) U.S. Cl.
CPC .......... *G16B 40/20* (2019.02); *G06N 3/0455* (2023.01); *G16B 15/30* (2019.02); *G16B 40/30* (2019.02)

(58) Field of Classification Search
CPC ........ G16B 40/20; G16B 15/30; G16B 40/30; G06N 3/0455
See application file for complete search history.

(56) References Cited

PUBLICATIONS

Palazzesi et al. (Deep Learning Applied to Ligand-Based De Novo Drug Design, Methods in Molecular Biology 2390, Springer Protocols, Nov. 4, 2021, p. 273-299) (Year: 2021).*

Xia et al. (DeepAssembly2: A Web Server for Protein Complex Structure Assembly Based on Domain-Domain Interactions, bioRxiv preprint, Nov. 25, 2024, pp. 1-15) (Year: 2024).*

Hayes et al. (Simulating 500 million years of evolution with a language model, bioRxiv preprint, Dec. 31, 2024, pp. 1-71) (Year: 2024).*

Deshpande et al. (RecT: A Recursive Transformer Architecture for Generalizable Mathematical Reasoning, International Workshop on Neural-Symbolic Learning and Reasoning (NeSy) 2020-2021, Oct. 25-27, 2021, 11 pages) (Year: 2021).*

Guo et al. (Multi-Modality Representation Learning for Antibody-Antigen Interactions Prediction, arXiv:2503.17666v1 [cs.LG] Mar. 22, 2025, pp. 1-8) (Year: 2025).*

Yang et al. (Dockformer: A transformer-based molecular docking paradigm for large-scale virtual screening, arXiv:2411.06740v4 [cs.LG] Dec. 5, 2024, pp. 1-15) (Year: 2024).*

(Continued)

*Primary Examiner* — Larry D Riggs, II
*Assistant Examiner* — Ghazal Sabour (57) ABSTRACT

Methods and apparatus for determining a representation of a protein-protein complex, given a constituent target complex of the protein-protein complex are presented; where the constituent target complex is some subset of the protein-protein complex. A recursive transformer neural network is devised, wherein for each iteration of the recursion, a representation of the output constituent protein complexed with the input constituent target complex is passed into the transformer as input for the next iteration. Some embodiments of the invention include design and manufacturing of effective synthetic biologic drugs, monoclonal antibody (mAb) drug, Antibody Drug Conjugate (ADC), peptide ligand drug, and small molecule drugs (SMDs).

20 Claims, 10 Drawing Sheets

An Illustrative Example of a Training Architecture of Protein Complex Determination Using a Recursive Bicapitate Transformer.

(56) References Cited

PUBLICATIONS

Liu et al. (OctSurf: Efficient hierarchical voxel-based molecular surface representation for protein-ligand affinity prediction, Journal of Molecular Graphics and Modelling, vol. 105, Jun. 2021, 107865, pp. 1-14) (Year: 2021).*

* cited by examiner

FIG. 1 Illustrative Example of Target Protein and Associated Ligand.

FIG. 2 Illustrative Example of an Amino Acid Embedding.

FIG. 3 Schematic Illustration of Protein-Protein Complex Determination Using a Recursive Multicapitate Transformer.

FIG. 4 An Illustrative Example of a Training Architecture of Protein Complex Determination Using a Recursive Bicapitate Transformer.

FIG. 5 An Illustrative Example of a Trimeric Protein Complex in a Training Dataset.

| | Protein Iter. | Seq. Itex. [gpu] | Encoder input | Decoder input | Sequence Label | Structure Label | |
|---|---|---|---|---|---|---|---|
| 630 | $\tau = 0$ | t=0 [gpu:0] | A-str Lys His Val Arg | A-str | Tyr | Str_B1 | 640 |
| | | t=1 [gpu:1] | A-str Lys His Val Arg | A-str B-str Tyr | Gly | Str_B2 | 645 |
| | | t=2 [gpu:2] | A-str Lys His Val Arg | A-str B-str Tyr Gly | Val | Str_B3 | 650 |
| | | t=3 [gpu:3] | A-str Lys His Val Arg | A-str B-str Tyr Gly Val | Trp | Str_B4 | 655 |
| | | t=4 [gpu:4] | A-str Lys His Val Arg | A-str B-str Tyr Gly Val Trp | Ser | Str_B5 | 660 |
| | | t=5 [gpu:5] | A-str Lys His Val Arg | A-str B-str Tyr Gly Val Trp Ser | EOP | | 665 |
| 635 | $\tau = 1$ | t=0 [gpu:6] | A-str Lys His Val Arg / B-str Tyr Gly Val Trp Ser | A-str B-str | Leu | Str_C1 | 670 |
| | | t=1 [gpu:7] | A-str Lys His Val Arg / B-str Tyr Gly Val Trp Ser | A-str B-str Str_C Leu | Phe | Str_C2 | 675 |
| | | t=2 [gpu:8] | A-str Lys His Val Arg / B-str Tyr Gly Val Trp Ser | A-str B-str Str_C Leu Phe | Thr | Str_C3 | 680 |
| | | t=3 [gpu:9] | A-str Lys His Val Arg / B-str Tyr Gly Val Trp Ser | A-str B-str Str_C Leu Phe Thr | EOC | | 685 |

FIG. 6 A Thread-wise Illustration of Inputs and Labels of a Training Architecture of a Recursive Bicapitate Transformer for Protein Complex Determination— Illustration Based on the Trimeric Protein Complex Example of FIG 5.

FIG. 7 An Illustrative Example of an Inference Architecture of Protein-Protein Interaction Complex Determination Using Recursive Bicapitate Transformer.

FIG. 8 An Illustration of a Trimeric Protein Complex about which Inference is Illustrated in FIG. 9.

FIG. 9 An Illustrative Example of an Inference Architecture of a Recursive Bicapitate Transformer for Protein Complex Determination — Illustration Based on the Trimeric Protein Complex Example of FIG. 8.

FIG. 10 Computing Environment

RECURSIVE TRANSFORMERS FOR AI-BASED PROTEIN-PROTEIN INTERACTION AND DRUG DESIGN

FIELD OF THE INVENTION

The present invention relates generally to Artificial Intelligence (AI) and Machine Learning (ML) methods for protein-protein interaction and drug ligand design, and specifically to the use of transformer neural networks for protein structure determination, protein design, and drug design.

BACKGROUND OF THE INVENTION

Many diseases are without any safe and effective treatment. This should not be the case, however, since diseases are dysfunctions in biological processes, essentially all biological processes are mediated by proteins, and we have a large amount of specific information about proteins and the biological processes they mediate. For instance, we know the amino acid sequence of all 20,000 common representative proteins in humans as well as a great deal of information about each of their respective structures. In addition, there are a growing number of databases (public, commercial, and proprietary) available with protein-protein complex data. This information encodes a vast amount of insight into cellular processes, which when coupled with deep learning approaches, provides rationale for methods and tools for effective drug design and development.

Despite these emerging opportunities the research and development pipeline for new drugs remains exorbitantly costly and lengthy, and yet highly inefficient. It often costs over $2 billion and more than 10 years to get a single candidate drug through clinical testing phases. Yet despite the exorbitant investment of time and resources, a high percentage of drugs fail in the clinical testing phases. Deep learning methods do hold great promise to shorten the drug discovery and development pipeline and make it more effective and efficient.

However, many of these emerging opportunities remain largely untapped. In particular, prior to this disclosure there was no protein-level recursive transformer neural network for obtaining a protein complex given a constituent protein or constituent subcomplex of that protein complex. As such, there remains a greatly unmet need for such an invention as disclosed herein.

While transformer neural networks have gained widespread use in the field of protein engineering, most of the questions and applications have focused on the protein folding problem, i.e. given a sequence, determine structure. A number of others have focused on protein design in the sense of an inverse protein folding problem—given a structure specification of a protein, determine a sequence.

The invention disclosed herein—of methods and apparatus using protein-level recursive transformers for obtaining protein complexes given constituent proteins or subcomplexes of their respective protein complexes—addresses an unmet need and provides a means of effective drug and diagnostics design and development.

OBJECTS OF THE INVENTION

It is an object of this invention to provide a system, method, and apparatus for obtaining a protein complex given a constituent protein or constituent subcomplex of that protein complex.

Another object of the invention is to provide a system, method, and apparatus for obtaining an effective drug ligand based on an analysis and selection of downstream signaling profile.

Yet another object of this invention is to provide a system, method, and apparatus for obtaining an effective antibody for therapeutic or diagnostic purposes.

Yet other objects, advantages, and applications of the invention will be apparent from the specifications and drawings included herein.

SUMMARY OF THE INVENTION

The invention disclosed herein includes a method comprising a protein-level recursive transformer neural network for determining a protein complex given a target complex which is a constituent of that protein complex. As such, we will also refer to the target complex as a constituent target complex.

The target complex can be a protein or a protein complex. The term transformer or transformer neural network, as used here and in the claims means any neural network with an attention mechanism.

The invention disclosed herein involves a method to receive representations of a plurality of protein complexes at a processor. The plurality of protein complexes is used to train a protein-level recursive transformer neural network. The trained transformer neural network is configured such that for each iteration of the protein-level recursion, it receives a target complex as input and generates as output, a protein, if any, in complex with the target complex. A complex of the output protein and the input target complex is then passed in as the input into the next iteration of the recursion. This protein-level recursive process continues till an <end-of-complex> representation is encountered, at which point a representation of the inferred protein complex is returned as final output.

In one embodiment of the invention, the transformer architecture is of encoder-decoder type and is multicapitate, including a structure head which generates the sequence and a sequence head which generates the structure. The structure of each protein in the input target complex can be represented by a structure input vector. The structure input vector is acted on by a structure embedding matrix to yield a structure embedding vector. Similarly, each residue representation of the input target complex is acted on by a residue embedding matrix to yield a residue embedding vector. The context array of structure and sequence embedding vectors is the input into the layers of the decoder. In one embodiment, the context array consists of structure embedding vectors, one per protein in the target complex, and residue embedding vectors, one per residue per protein in the target complex. The input context array is then transformed by the respective module layers of the decoder.

In one embodiment of the invention, the final output layer of the encoder output enters the decoder in a cross-attention layer. The direct input into the decoder passes through a self-attention and subsequently through the cross attention layer. This ordering however is in no way a limitation, as the modules, blocks, and number of modular repetitions, are an architectural design hyperparameter of transformer neural networks.

In one embodiment of the invention, the residue generation aspect proceeds via autoregression. This is also a recursive process, but for a residue-level recursion (i.e. an inner loop) wherein the residue output from one such iteration is joined or concatenated to the input context array of that iteration to get the input context array of the next iteration.

In summary, the invention disclosed herein consists of systems, methods, and apparatus to use a protein-level recursive transformer neural network to generate a representation of a protein complex given a representation of a target complex which is a constituent of that protein complex, wherein the given target complex is a protein or a protein complex.

The invention consists of several outlined processes below, and their relation to each other, as well as all modifications which leave the spirit of the invention invariant. The scope of the invention is outlined in the claims section.

BRIEF DESCRIPTION OF THE DRAWINGS

In the following detailed description of the invention, we reference the herein listed drawings and their associated descriptions, in which.

DETAILED DESCRIPTION OF THE PREFERRED EMBODIMENTS

Figure 1:
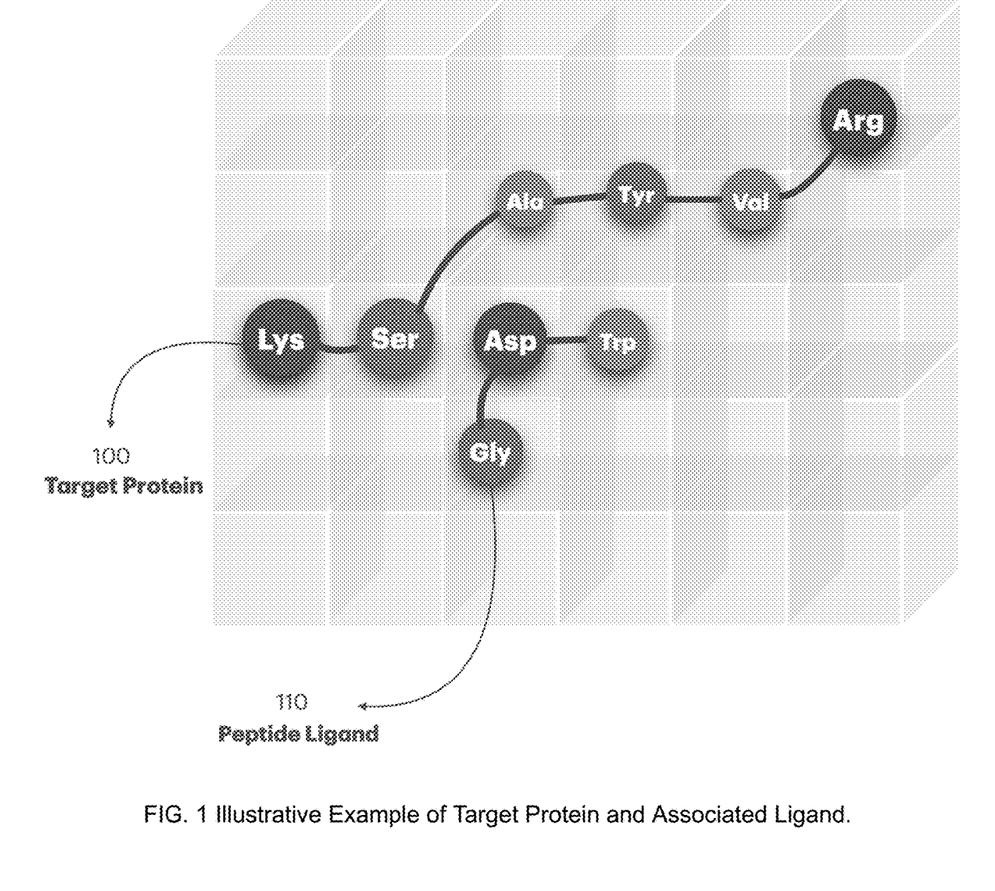
FIG. 1 is an illustrative example of target protein and associated ligand.

FIG. 1 illustrates a target protein 100 in complex with an associated oligopeptide ligand 110, wherein the peptide ligand consists of three amino acids. FIG. 1 is a simple illustrative example of a protein complex. The invention disclosed herein includes a method wherein a dataset consisting of representations of a plurality of protein complexes is used to train a transformer neural network; wherein the trained transformer neural network is used to output a protein complex given a constituent target complex of that protein complex.

Figure 2:
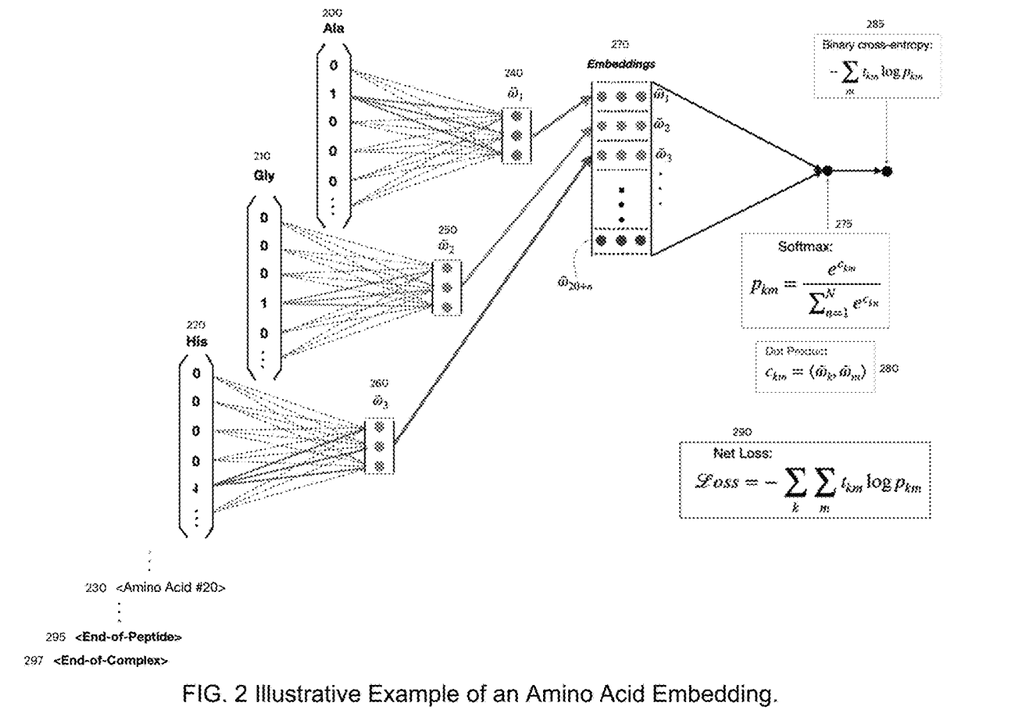
FIG. 2 is an illustrative example of an amino acid embedding.

FIG. 2 illustrates the amino acid embedding procedure. The initial encoding of the amino acid residues is a one-hot-encoding as illustrated in 200, 210, and 220, wherein all but one entry of the vector are zeros and the non-zero entry is a 1 indicating the amino acid it encodes. The one-hot-encoding is sparse and does not convey any semantic meaning, serving instead only as a unique identifier of the respective amino acid.

In one embodiment of the invention, there are 20+n such one-hot-encoder vectors, where 20 are for the 20 amino acids in humans, and n is the number of auxiliary tokens such as an <End-of-Peptide> token 295 or an <End-of-Complex> 297.

Each of the one-hot-encoder vectors are used to right multiply a shared weight matrix, thereby effectively picking out the one column of the shared weight matrix that corresponds to the unique index or address of that amino acid. That unique column is the corresponding vector embedding of that amino acid, as illustrated in 240, 250, and 260, corresponding respectively to one-hot-encoder vectors 200, 210, and 220 respectively. As noted, since the vector embeddings are simply columns of the shared weight matrix, it follows that their entries are themselves the learnable weights of the residue embedding neural network.

The residue embedding neural network takes the pairwise dot product 280 of embeddings. Then for each amino acid residue, it applies a softmax activation 275 to convert the vector of dot products into a probability distribution. In one embodiment, the probability distribution is intended to indicate the probability that the subject amino acid is in close sequence proximity to the amino acid being evaluated. If they are typically in close proximity, then the dot product of their respective embedding vectors should be closer to 1, and if they are rarely in close sequence proximity, the dot product should be closer to zero. There are other methods for implementing the loss function 290 in this invention, sequence proximity being just a non-limiting example.

In one embodiment, a cross entropy loss 285 can then be used, wherein the target distribution is empirically determined by sequence proximity, i.e. $t_{km}$ is a distribution whose value is closer to 1 for amino acids m typically of close sequence proximity to amino acid k, and closer to zero for for amino acids m of far sequence proximity to amino acid k. The net loss 290 is the sum of the losses across all the amino acids. By way of example but not limitation, an optimization method such as stochastic gradient descent can then be used to train the network.

Figure 3:
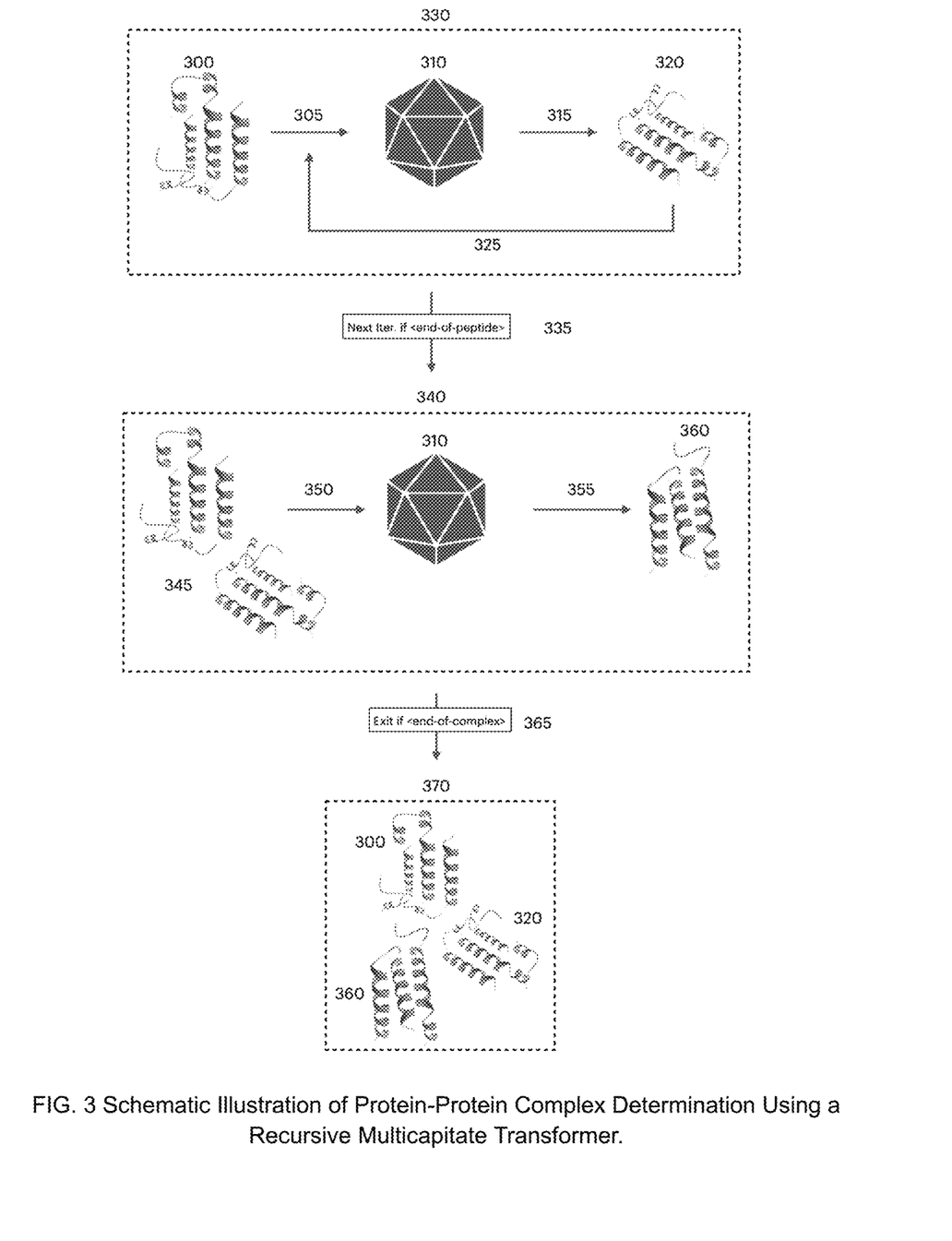
FIG. 3 is a schematic illustration of protein complex determination using a recursive multicapitate transformer.

FIG. 3 is a schematic illustration of protein-protein complex determination using a protein-level recursive transformer. In this illustration, a representation of a single protein 300 is passed as input into a transformer 310 trained to output a representation of a protein 320 in complex with the input protein 300. Here and in the claims, transformer means a neural network with an attention mechanism. In the embodiment of the invention exemplified in FIG. 3, the output protein 320 is generated residue-wise via autoregression, and an <end-of-peptide> token condition 335 on the inner loop (residue-wise iteration) 330 instructs the outer loop (i.e. protein-wise iteration) recursion to advance to the next iteration 340. In other words, the <end-of-peptide> token condition 335 triggers the algorithm to begin generating the next protein in the complex.

The input into the next iteration 340 of the outer loop consists of the output protein 320 of the prior iteration complexed with the input protein 300 of the prior iteration. The resulting complex 345 is passed as input into the transformer 310 to yield a representation of a protein 360 in complex with the input complex 345.

In this particular example of FIG. 3, the inferred complex is trimeric, consisting of three proteins in complex: 300, 320, 360. Therefore during the inner loop of the final protein-level iteration 340, upon inferring an <end-of-complex> token, the condition 365 triggers an exit, yielding the final output protein complex 370.

As illustrated in the example of FIG. 3, the input into the transformer architecture can be a single protein as in 300 or a protein complex as in 345, hence we herein use the general term target complex, and particularly constituent target complex to highlight the target complex' relationship as a constituent subcomplex of the final output protein complex.

Figure 4:
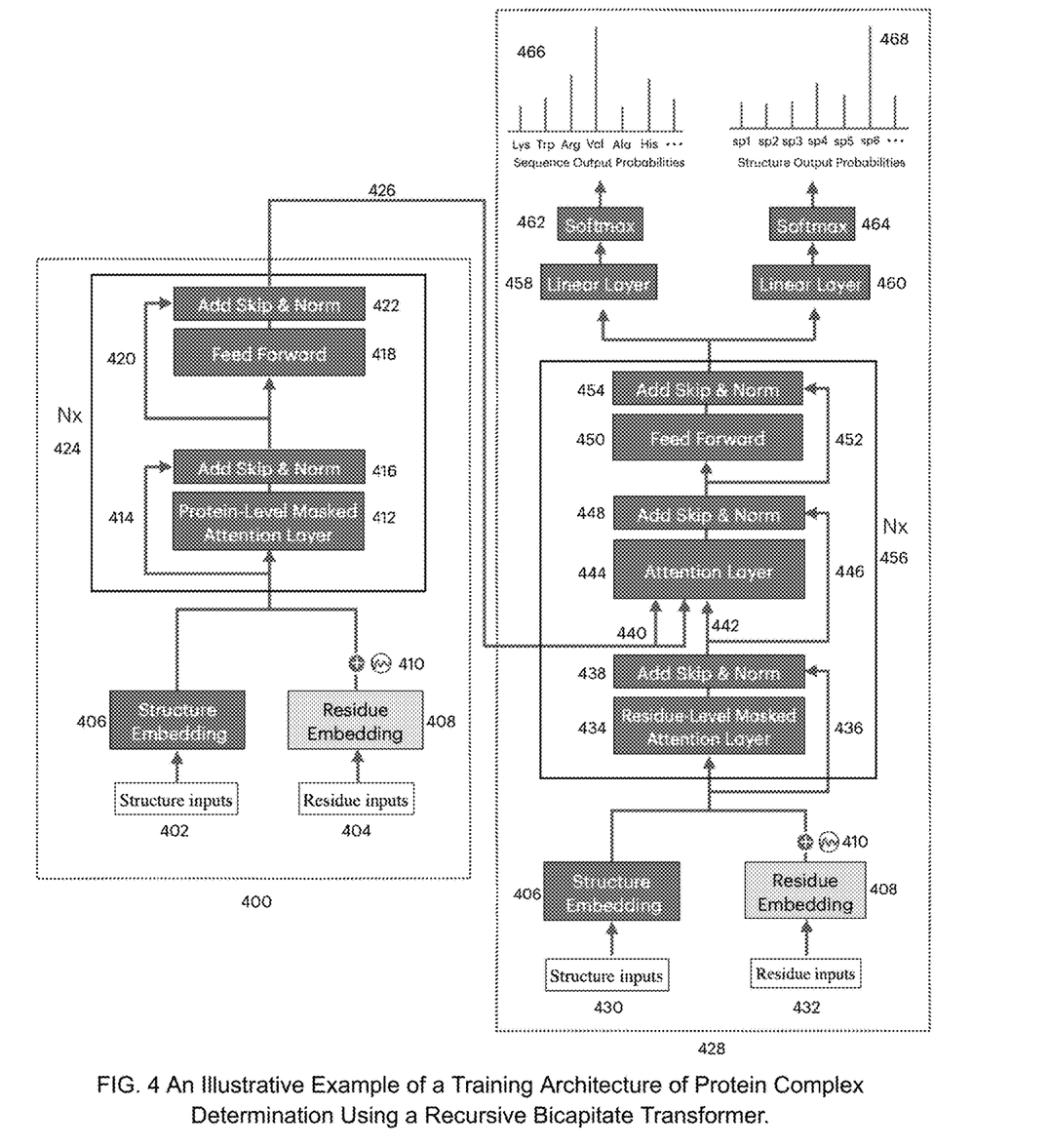
FIG. 4 is an illustrative example of a training architecture of protein complex determination using a recursive bicapitate transformer.

FIG. 4 is an illustrative example of a training architecture of protein-protein complex determination using a recursive bicapitate transformer. The objective in this embodiment is: given a sequence and structure representation of proteins in a target complex, determine a sequence and structure representation of each constituent protein in a protein complex of which the target complex is a constituent. In the embodiment of the invention exemplified in FIG. 4, the transformer architecture is encoder-decoder with the encoder 400 accepting a structure and sequence representation of the target complex as input. The decoder 428 accepts input both directly as well as from the encoder. The final output layer context array of the encoder enters the decoder for cross-attention 444. Additionally, in this embodiment, the decoder contains a residue-wise autoregression (inner loop) of the transformer. The transformer in this exemplified embodiment is bicapitate (has two heads), a sequence head which generates an residue output probability 466 and a structure head which generates structure output probabilities 468.

Upon encountering a representation of an <end-of-peptide> token, a representation of the complex of the output protein and the input target complex are passed as input into the encoder, and the next iteration of the outer loop (protein-wise iteration) begins. Upon encountering a representation of an <end-of-complex> token, the complex of the input target complex of the current iteration and the output protein is returned as the final output protein complex.

As noted, the embodiment illustrated in FIG. 4 is for training, wherein the training objective is for the trained transformer to generate a representation of peptide sequence and structure, given a sequence and structure representation of a target complex.

The encoder 400 accepts a structure input vector 402 into the structure embedding 406. The structure input vector is a vector of structure parameters. In one embodiment, it is of fixed length, L, and zero padding is used for target proteins whose structure parameters are represented by a vector of smaller length than the fixed length, L. The fixed length, L, is a hyperparameter.

The structure embedding is a weight matrix, $W_s$, which the structure input vector, x, 402 multiplies to yield the structure embedding vector, s, as follows:

$$W_s x = s$$

where $W_s$ is an m×L matrix, L is the fixed length of the structure input vector, and m is the length of the amino acid residue embedding vectors. Both m and L are hyperparameters of the model.

The target complex's amino acid residue inputs 404 can be in the form of one-hot-encoder vectors which are passed into the residue embedding 408 described in FIG. 2. A position encoding 410 can be added to the output residue embedding vectors to imprint a signal of sequence position on the respective residue embeddings.

An array of vectors consisting of the structure embedding vector(s) and each of the residue embedding vectors of the target complex is passed as input into an attention layer 412. There are a number of ways to implement attention mechanisms. In one embodiment, attention layers consist of three types of weight matrices: a query weight matrix, $W_q$, a key weight matrix, $W_k$, and a value weight matrix, $W_v$. Each of the embedding vectors in the array are then multiplied by each of the three matrices to obtain respective queries, keys, and values, as follows:

$$W_q u = q$$

$$W_k u = k$$

$$W_v u = v$$

where u is an embedding vector (i.e. either the structure embedding vector s or one of the residue embedding vectors r).

For each embedding vector in the array, its respective query vector is dotted (i.e. dot product) with the key vectors of all tokens representations in the context array. Next a softmax operation is done on the resulting array to yield a probability distribution for each token. Next, for each token, a linear combination of values v is taken wherein the coefficient of each value is the respective probability (i.e. attention weight). The output of this linear combination is then taken as the token's respective output into the next layer of the transformer. This is done for each token, therefore the length of the input array and the length of the output array from this attention layer 412 are the same. Given the ith token, its corresponding coefficient associated with the jth token can be denoted $c_{ij}$ and is given by, $$c_{ij} = \frac{e^{\langle qi, kj \rangle}}{\sum_p e^{\langle qi, kp \rangle}}$$

The attention layer output of the ith token can be denoted $o_i$ and is then given by, $$o_i = \Sigma_j c_{ij} v_j$$

In some embodiments, the dot product $\langle q_i, k_j \rangle$ can be scaled by a variance factor.

The array of outputs $o_i$ are then passed into a normalization layer 416. Furthermore, a copy of the input array which was passed into the attention layer is passed 414 into and added to a normalization layer, skipping the attention layer. This skip connection serves to preserve the pre-attention layer character signal thereby enhancing available signals for learning.

The output from the Add skip & Norm layer 416 is passed into a feed forward neural network layer 418 and from there into another Add skip & Norm layer 422. The block module 424 of "attention→add skip & norm→feed forward→Add-skip & norm" is repeated N number of times where N is a hyperparameter of the model architecture.

The final output array of the encoder part is then passed 426 into the decoder part 428. In particular, it enters the decoder at a cross attention layer 444, wherein the encoder output array joins the incoming token from the preceding layer 438 of the decoder. The subject token then attends to all elements in the combined array via the previously described attention mechanism, hence the term cross attention.

The decoder receives input both from the encoder via cross attention input 440 as well as directly via the structure vector input 430 (and autoregressively via residue inputs 432). The structure vector input enters a self-attention layer 434 whose context array—in one embodiment of the invention—consists of only one token, initially the structure embedding vector, which self-attends to itself; after which it is passed to add skip & norm layer 438 and then onwards to cross attention layer 444. The block module 456 repeats N times where N is a hyperparameter of the model.

In this embodiment of FIG. 4, the transformer is bicapitate in that it has two distinct heads, a sequence head and a structure head, terminating in output probability distributions 466 and 468 respectively. The direct input into the decoder consists of both a target complex structure input vector 430 as well as a residue input vector 432 which enters sequentially in an autoregressive manner.

In some other embodiments, the emerging protein's structure may also be autoregressively entered as a direct input.

The transformer training architecture is designed for parallelism. In particular, for each amino acid residue token representation in an output protein sequence to be generated, the preceding amino acid residues of the output protein as well as the label (i.e. the correct amino acid residue token) are both known and available for end-to-end differentiable supervised learning. Hence the prediction of each amino acid residue token can be run simultaneously with the shared weights of the architecture being updated simultaneously. The implementation of this is reflected in the causal masking of the residue-level masked attention layer 434, wherein for any given residue in the output protein representation, the preceding sequence and structure representations of the output protein are visible to the prediction algorithm and used in attention layer, but its residue answer label (i.e. identity and structure representation of the correct next amino acid in the sequence) is masked from the prediction algorithm.

Similarly, for the outer loop (i.e. protein-level recursion) aspect as manifested on the encoder side 400, the sequence and structure representation of the full target complex is known and visible to the prediction algorithm only for the current and all preceding outer loop iterations. However, the full target complex of all later iterations is masked during the current iteration. This masking is a form of train-test separation, and is reflected as the causal masking in the protein-level masked attention layer 412.

End-to-end stochastic gradient descent (or other optimization), is then performed in parallel for each amino acid, wherein each parallel process updates the set of shared weights as it proceeds. This parallelism, however, is simply an implementation embodiment example, and not a limitation of the invention in any way.

In the embodiment of FIG. 4, the <start-of-sequence> token is taken as the structure input vector 430. Subsequent subject tokens are the leading amino acid residues and are passed in from the final output layer in an autoregressive manner. As noted however, since both the preceding residues of the output protein and the residue answer labels are fully known during training, the architecture is such that training can be done in parallel i.e. without needing to wait in sequence.

In one embodiment, the structure input vector 430 is updated with each iteration of the autoregression, as the residues of the emerging output protein become known, the length of the zero padding aspects of the fixed length structure input vector decreases by 1, and the learnable structure embedding is computed via matrix multiplication as described.

The residue embedding 408 is as described earlier in FIG. 2.

The sequence head's final layer output probabilities 466 are over representations of the amino acids and auxiliary tokens such as an <end-of-sequence> token and an <end-of-complex> token. By way of example but not limitation, a cross-entropy loss function can be implemented and then stochastic gradient descent (or other optimization) used to optimize the model. Therefore, backpropagation of errors computed at the sequence head terminal results in weight updates in the sequence head as well as in all other upstream weights in the transformer body that contributed to the sequence head loss. In this sense, the non-capitate weights are shared.

Similarly, the structure head's final layer output probabilities 468 are over the structure parameters for encoding a residue. By way of example but not limitation, they may be spatial coordinate locations of the voxels in a 3D grid, or they may be unique identifiers ("address") of the voxels in a 3D grid, or representative values of a discretization of the range of possible torsion angles. Similarly to the sequence head, by way of example but not limitation, a cross-entropy loss function can be implemented and then stochastic gradient descent (or other optimization) used to optimize the model. Therefore, backpropagation of errors computed at the structure head terminal results in weight updates in the structure head as well in all other upstream weights in the transformer body that contributed to the structure head loss. In this sense, the non-capitate weights are shared.

As the protein-wise generation of the protein complex proceeds (the outer loop), and within that, as the residue-wise generation of each constituent protein proceeds (the inner loop), the structure of the residue currently being generated should not conflict with the structure specification of the already generated proteins and residues of the emerging complex. In some embodiments, this structural consistency is enforced by adding a structural inconsistency penalty term to the loss function.

Figure 5:
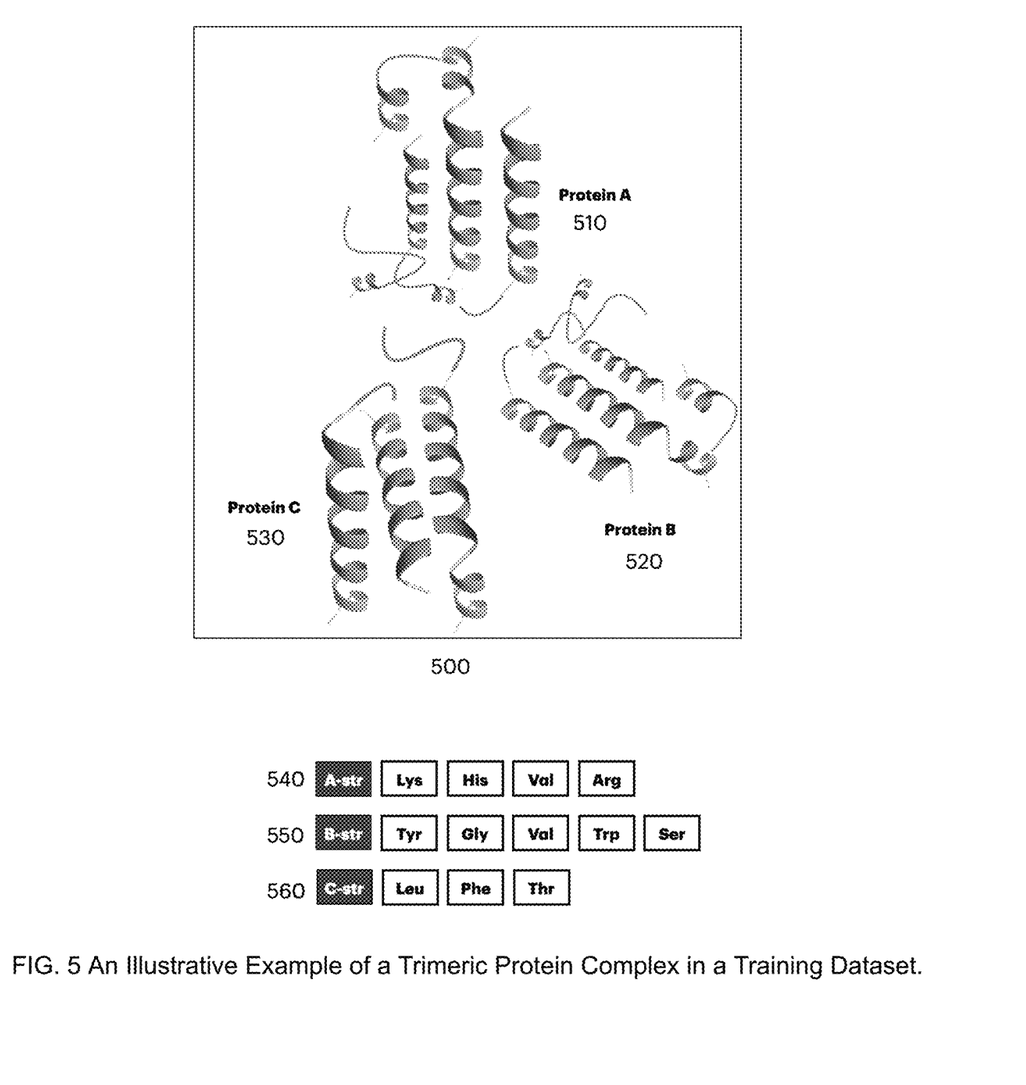
FIG. 5 is an illustration of a trimeric protein complex in a training dataset.

FIG. 5 is an illustrative example of a trimeric protein complex 500 in a training dataset. In this example, the three proteins are labeled Protein A 510, Protein B 520, and Protein C 530. For each constituent protein in the complex, a representation of its structure and sequence is shown. For Protein A's representation 540, the structure representation vector is denoted [A-str], while its respective residue representations are denoted [Lys], [His], [Val], and [Arg] respectively. Similarly, Protein B's representation is denoted [B-str][Tyr][Gly][Val][Trp][Ser]; and Protein C's representation is denoted [C-str][Leu][Phe][Thr]. The simple trimeric complex illustrated in this example of FIG. 5 will be used in FIG. 6 below to further describe the training architecture of the recursive bicapitate transformer.

Figure 6:
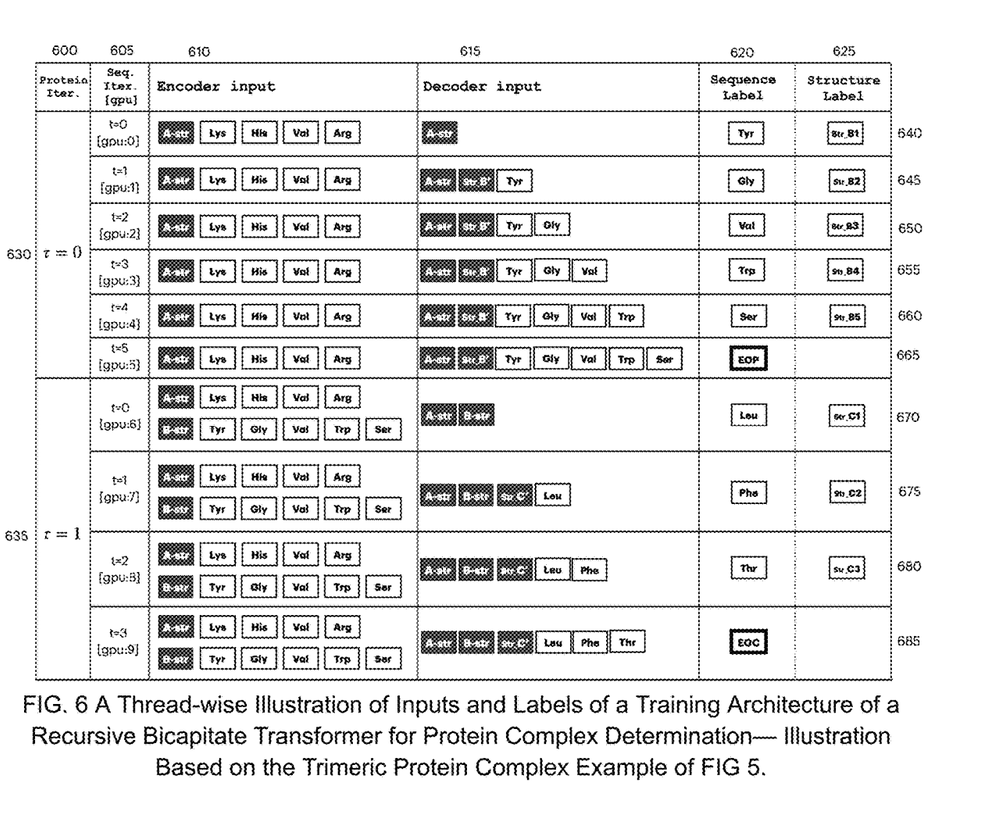
FIG. 6 is a thread-wise illustration of inputs and labels of a training architecture of a recursive bicapitate transformer for protein complex determination.

FIG. 6 is a thread-wise illustration table of inputs and labels of a training architecture of a recursive bicapitate transformer for protein complex determination. The illustration is based on the trimeric protein complex example of FIG. 5.

In the table of FIG. 6, the protein-wise iteration column 600 consists of two iterations, tau=0 and tau=1, corresponding to row groups 630 and 635 respectively. This is because the protein complex being learned in this example is trimeric, hence given one of the proteins as a target complex, generation of a second of the proteins is learned in the tau=0 thread group 630, and generation of the third (and final) protein given the complex of the first two proteins is learned in the tau=1 thread group 635.

The "sequence iteration [gpu]" column 605 denotes the residue thread. In particular, each residue has an independent thread. Here, [gpu:x] simply exemplifies that these are threads and can be computed independently of each other, and simultaneously in parallel. The encoder input column 610 shows the encoder input for each thread. For each of the threads in the tau=0 group 630, the encoder input is the Protein A representation [A-str][Lys][His][Val][Arg]; and for each thread in the tau=1 group 635, the encoder input is a representation of the complex of Protein A and Protein B and is given by, [A-str][Lys][His][Val][Arg][B-str][Tyr][Gly][Val][Trp][Ser].

The decoder input column 615 shows the direct input into the decoder for each thread. The sequence label column 620 and the structure label column 625 respectively show the residue label and associated structure label, each of which the transformer is learning to predict for each thread given the inputs.

For the t=0 thread 640, the decoder's direct input is [A-str] and the sequence label (the final output of the sequence head) is [Tyr]; while the structure label (the final output of the structure head) is denoted [Str_B1], and in this embodiment, it is the structure input vector consisting of structure parameters of the first residue and zero padding for everything else. For the t=1 thread 645, the decoder's direct input is [A-str][Str_B'][Tyr]. In other words, it is the t=0 thread input concatenated with the t=0 thread output, wherein the embedding of the output structure vector is denoted [Str_B']. The value of [Str_B'] varies by thread as described. In particular, for t=1, $[Str\_B']=W_s*[Str\_B1]$; for t=2, $[Str\_B']=W_s*[Str\_B2]$; for t=x, $[Str\_B']=W_s*[Str\_Bx]$.

For t=5 thread 665, the decoder input is [A-str][Str_B'][Tyr][Gly][Val][Trp][Ser]. Since [Ser] is the final residue in the predicted output protein, the sequence label is a representation of an <end-of-peptide> token and is denoted [EOP].

For the tau=1 group of threads 635, the process is the same, except for the terminating condition which is a representation of an <end-of-complex> token, here denoted [EOC] in the t=3 thread 685.

Figure 7:
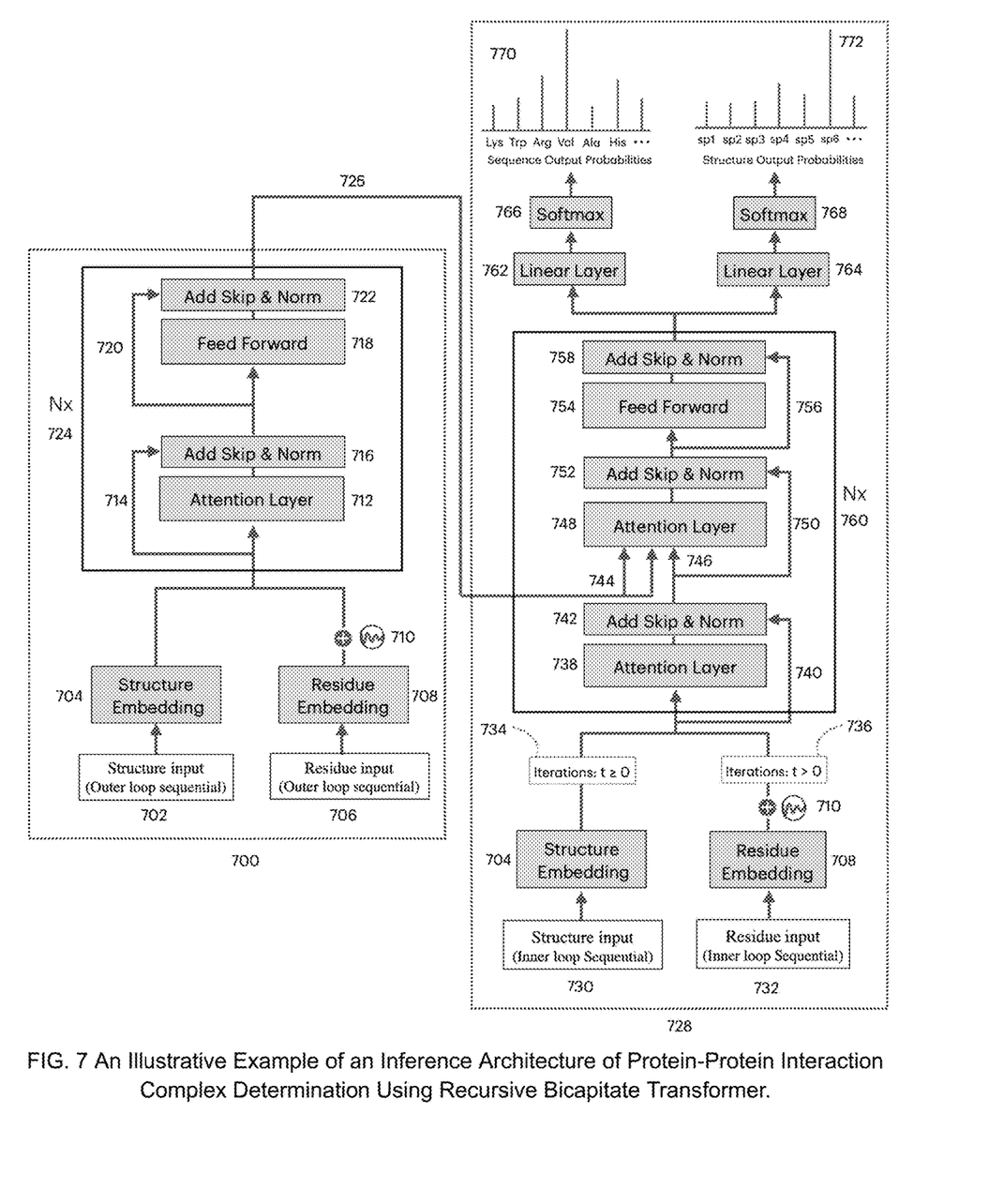
FIG. 7 is an illustrative example of an inference architecture of protein complex determination using a recursive bicapitate transformer.

FIG. 7 is an illustrative example of an inference architecture for protein complex determination using a trained recursive bicapitate transformer. The objective of this exemplified embodiment of the invention is: given a sequence and structure representation of a constituent target complex, generate a sequence and structure representation for each constituent protein of a protein complex of which the target complex is a constituent.

One set of differences between the training (FIG. 4) and the inference (FIG. 7) architectures of the recursive transformer stems from parallelizeability, in that the training architecture is parallelizeable while the inference architecture is not parallelizeable in the same way. In particular, in the training architecture, since the labels and inputs are all known during training, there is a need for protein-level masking in the encoder's attention layer 412 and residue-level masking in the decoder's attention layer 434. However, in the inference architecture, the residue and protein generation must be done sequentially.

The other set of differences between the training (FIG. 4) and the inference (FIG. 7) architectures, stems from the basic purpose of training vs inference. In particular, since the inference architecture does not involve training, the sequence and structure heads are not associated with a loss function. Instead, they simply terminate with their respective output probabilities 770 and 772. The weights are learnable in training and frozen in inference.

Figure 8:
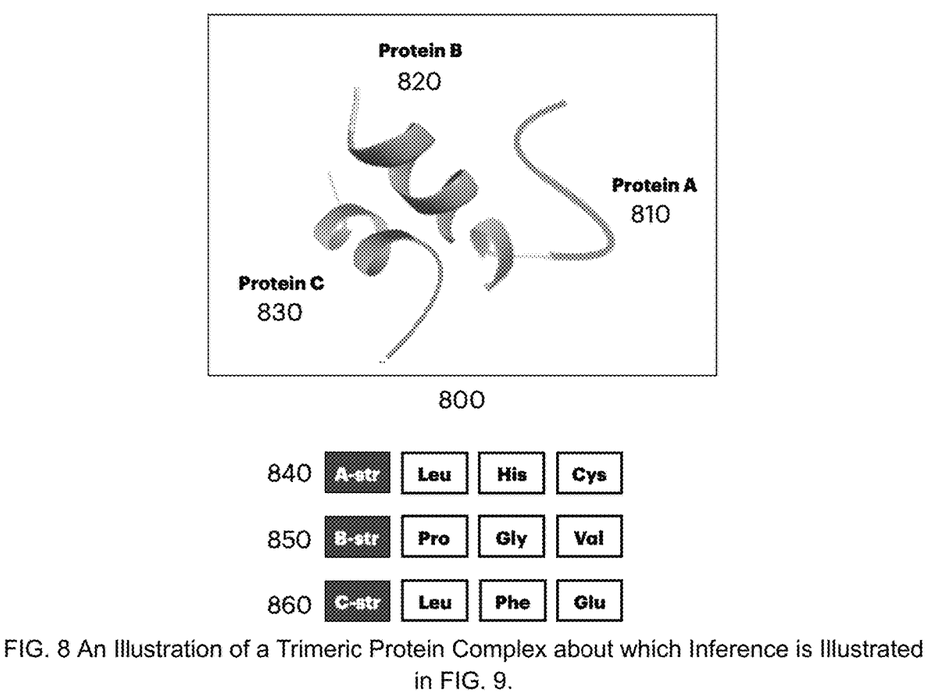
FIG. 8 is an illustration of a trimeric protein complex about which inference is illustrated in FIG. 9.
Figure 9:
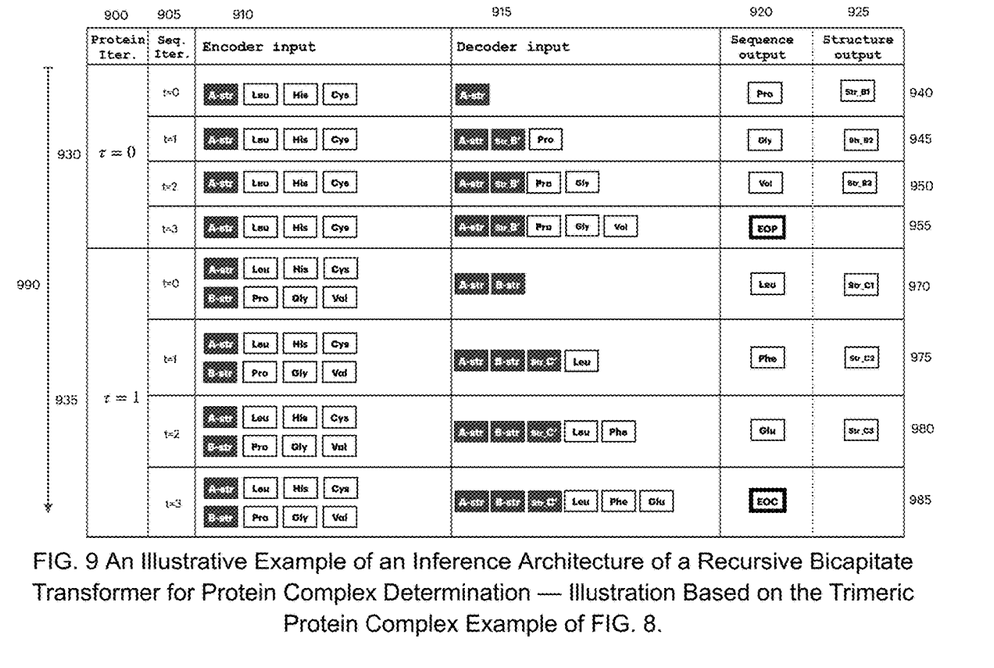
FIG. 9 is an illustrative example of an inference architecture of a recursive bicapitate transformer for protein complex determination.

FIG. 8 is an illustration of a trimeric protein complex about which inference is illustrated in FIG. 9. The trimeric complex 800 consists of the following three proteins: Protein A 810, Protein B 820, and Protein C 830. In this illustrative example, the representation of Protein A is denoted by [A-str][Leu][His][Cys], the representation of Protein B is denoted by [B-str][Pro][Gly][Val], and the representation of Protein C is denoted by [C-str][Leu][Phe][Glu].

FIG. 9 is an illustration of an inference architecture of a recursive bicapitate transformer for protein complex determination. The illustration is based on the trimeric protein complex example of FIG. 8. In the embodiment depicted in the table of FIG. 9, the directional arrow 990 highlights the necessarily sequential nature of the inference procedure and architecture. This is in contrast to the training procedure and architecture, wherein each thread can be run independently of the others and in parallel. The encoder input of the tau=0 thread group 930 is given by [A-str][Leu][His][Cys].

In the embodiment exemplified here, for the tau=0 thread group's t=0 thread 940, the decoder input 915 is given by [A-str], the input structure vector embedding of Protein A. The sequence output is [Pro] and the structure output representation is denoted [Str_B1]. These decoder outputs of the t=0 thread 940 are joined to the decoder inputs of the thread to get the decoder inputs into the t=1 thread 945. In particular, the t=1 decoder input is [A-str][str_B'][Pro], where [str_B'] denotes the embedding of the emerging zero padded structure input vector. The sequence output is [Gly] and the corresponding structure output representation is denoted [Str_B2]. The process continues sequentially as described until termination via an <end-of-complex>[EOC] token representation 985.

Figure 10:
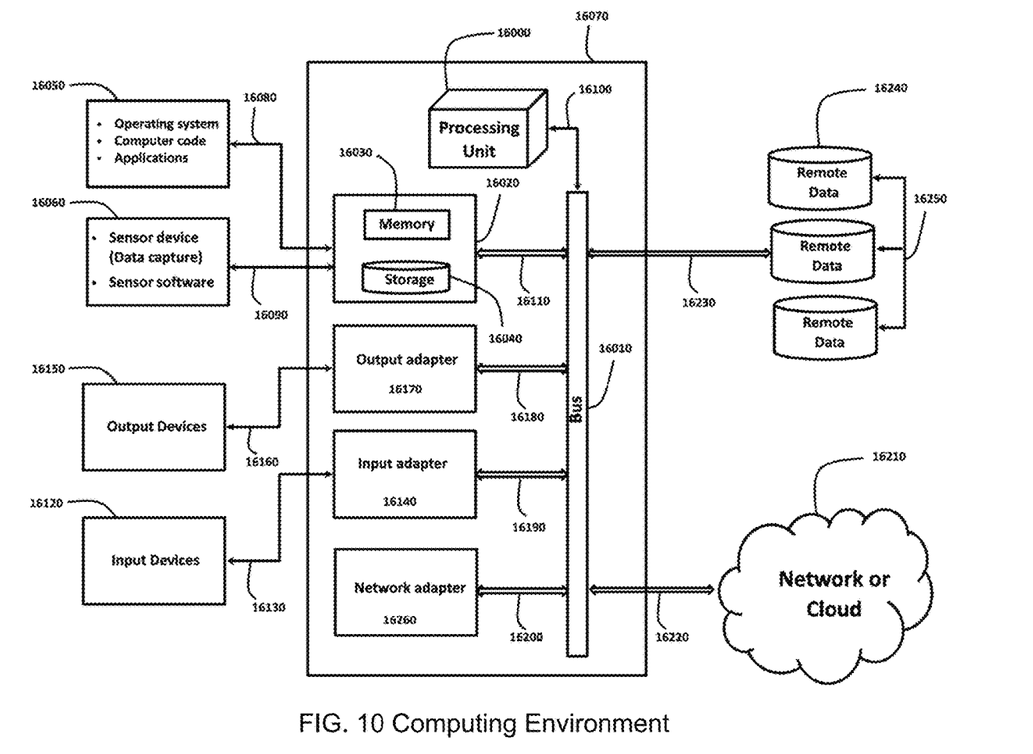
FIG. 10 is an example of a computing environment.

Ones with ordinary skill in the art will recognize that the invention disclosed herein can be implemented over an arbitrary range of computing configurations. We will refer to any instantiation of these computing configurations as the computing environment. An illustrative example of a computing environment is depicted in The Computing Environment FIG. Examples of computing environments include but are not limited to desktop computers, laptop computers, tablet personal computers, mainframes, mobile smart phones, smart television, programmable hand-held devices and consumer products, distributed computing infrastructures over a network, cloud computing environments, or any assembly of computing components such as memory and processing—for example.

As illustrated in The Computing Environment FIG, the invention disclosed herein can be implemented over a system that contains a device or unit for processing the instructions of the invention. This processing unit 16000 can be a single core central processing unit (CPU), multiple core CPU, graphics processing unit (GPU), multiplexed or multiply-connected GPU system, or any other homogeneous or heterogeneous distributed network of processors.

In some embodiment of the invention disclosed herein, the computing environment can contain a memory mechanism to store computer-readable media. By way of example and not limitation, this can include removable or non-removable media, volatile or non-volatile media. By way of example and not limitation, removable media can be in the form of flash memory card, USB drives, compact discs (CD), blu-ray discs, digital versatile disc (DVD) or other removable optical storage forms, floppy discs, magnetic tapes, magnetic cassettes, and external hard disc drives. By way of example but not limitation, non-removable media can be in the form of magnetic drives, random access memory (RAM), read-only memory (ROM) and any other memory media fixed to the computer.

As depicted in The Computing Environment FIG, the computing environment can include a system memory 16030 which can be volatile memory such as random access memory (RAM) and may also include non-volatile memory such as read-only memory (ROM). Additionally, there typically is some mass storage device 16040 associated with the computing environment, which can take the form of hard disc drive (HDD), solid state drive, or CD, CD-ROM, blu-ray disc or other optical media storage device. In some other embodiments of the invention the system can be connected to remote data 16240.

The computer readable content stored on the various memory devices can include an operating system, computer codes, and other applications 16050. By way of example not limitation, the operating system can be any number of proprietary software such as Microsoft windows, Android, Macintosh operating system, iphone operating system (iOS), or Linux commercial distributions. It can also be open source software such as Linux versions e.g. Ubuntu. In other embodiments of the invention, data processing software and connection instructions to a sensor device 16060 can also be stored on the memory mechanism. The procedural algorithm set forth in the disclosure herein can be stored on—but not limited to—any of the aforementioned memory mechanisms. In particular, computer readable instructions for training and subsequent image classification tasks can be stored on the memory mechanism.

The computing environment typically includes a system bus 16010 through which the various computing components are connected and communicate with each other. The system bus 16010 can consist of a memory bus, an address bus, and a control bus. Furthermore, it can be implemented via a number of architectures including but not limited to Industry Standard Architecture (ISA) bus, Extended ISA (EISA) bus, Universal Serial Bus (USB), microchannel bus, peripheral component interconnect (PCI) bus, PCI-Express bus, Video Electronics Standard Association (VESA) local bus, Small Computer System Interface (SCSI) bus, and Accelerated Graphics Port (AGP) bus. The bus system can take the form of wired or wireless channels, and all components of the computer can be located remote from each other and connected via the bus system. By way of example and not of limitation, the processing unit 16000, memory 16020, input devices 16120, output devices 16150 can all be connected via the bus system. In the representation depicted in The Computing Environment FIG, by way of example not limitation, the processing unit 16000 can be connected to the main system bus 16010 via a bus route connection 16100; the memory 16020 can be connected via a bus route 16110; the output adapter 16170 can be connected via a bus route 16180; the input adapter 16140 can be connected via a bus route 16190; the network adapter 16260 can be connected via a bus route 16200; the remote data store 16240 can be connected via a bus route 16230; and the cloud infrastructure can be connected to the main system bus vis a bus route 16220.

In some embodiment of the invention disclosed herein, The Computing Environment FIG illustrates that instructions and commands can be input by the user using any number of input devices 16120. The input device 16120 can be connected to an input adapter 16140 via an interface 16130 and/or via coupling to a tributary of the bus system 16010. Examples of input devices 16120 include but are by no means limited to keyboards, mouse devices, stylus pens, touchscreen mechanisms and other tactile systems, microphones, joysticks, infrared (IR) remote control systems, optical perception systems, body suits and other motion detectors. In addition to the bus system 16010, examples of interfaces through which the input device 16120 can be connected include but are by no means limited to USB ports, IR interface, IEEE 802.15.1 short wavelength UHF radio wave system (bluetooth), parallel ports, game ports, and IEEE 1394 serial ports such as FireWire, i.LINK, and Lynx.

In some embodiment of the invention disclosed herein, The Computing Environment FIG illustrates that output data, instructions, and other media can be output via any number of output devices 16150. The output device 16150 can be connected to an output adapter 16170 via an interface 16160 and/or via coupling to a tributary of the bus system 16010. Examples of output devices 16150 include but are by no means limited to computer monitors, printers, speakers, vibration systems, and direct write of computer-readable instructions to memory devices and mechanisms. Such memory devices and mechanisms can include by way of example and not limitation, removable or non-removable media, volatile or non-volatile media. By way of example and not limitation, removable media can be in the form of flash memory card, USB drives, compact discs (CD), blu-ray discs, digital versatile disc (DVD) or other removable optical storage forms, floppy discs, magnetic tapes, magnetic cassettes, and external hard disc drives. By way of example but not limitation, non-removable media can be in the form of magnetic drives, random access memory (RAM), read-only memory (ROM) and any other memory media fixed to the computer. In addition to the bus system 16010, examples of interfaces through which the output device 16150 can be connected include but are by no means limited to USB ports, IR interface, IEEE 802.15.1 short wavelength UHF radio wave system (bluetooth), parallel ports, game ports, and IEEE 1394 serial ports such as FireWire, i.LINK, and Lynx.

In some embodiment of the invention disclosed herein some of the computing components can be located remotely and connected to via a wired or wireless network. By way of example and not limitation, The Computing Environment FIG shows a cloud 16210 and a remote data source 16240 connected to the main system bus 16010 via bus routes 16220 and 16230 respectively. The cloud computing infrastructure 16210 can itself contain any number of computing components or a complete computing environment in the form of a virtual machine (VM). The remote data source 16240 can be connected via a network to any number of external sources such as NMR spectrometry devices, X-ray diffraction devices, electron microscopes, imaging devices, imaging systems, or imaging software.

In some embodiment of the invention disclosed herein, a sensor system 16060 which captures and pre-processes data is attached directly to the system. For example, this may be an electron microscope (and associated image processing software); it may be a camera in the case of an imaging system, say for processing distance map photographs; or it may be an X-ray crystallography machine or an NMR spectrometer (and associated software), etcetera. Stored in the memory mechanism —16020, 16240, or 16210—are machine learning models, algorithms, and data products developed according to the procedures set-forth herein. Computer-readable instructions are also stored in the memory mechanism, so that upon command, protein structure representation data, its substrates and associated data can be captured or can be received over a network from a remote or local previously collated database. This transmission of data can be done over a wired or wireless network as previously detailed, as the source and/or recipient of the data output can be at a remote location.

The objects set forth in the preceding are presented in an illustrative manner for reason of efficiency. It is hereby noted that the above disclosed methods and systems can be implemented in manners such that modifications are made to the particular illustration presented above, while yet the spirit and scope of the invention is retained. The interpretation of the above disclosure is to contain such modifications, and is not to be limited to the particular illustrative examples and associated drawings set-forth herein.

Furthermore, by intention, the following claims encompass all of the general and specific attributes of the invention described herein; and encompass all possible expressions of the scope of the invention, which can be interpreted—as pertaining to language—as falling between the aforementioned general and specific ends.

What is claimed:

1. A method, comprising:
   a) receiving, at a processor, representations of a plurality of protein-protein complexes;
   b) using the representations of the plurality of protein-protein complexes to train a neural network to obtain a representation of a protein-protein complex, given a representation of a constituent target complex of that protein-protein complex:
   ii) wherein the constituent target complex is a protein or protein-protein complex,
   iii) wherein the neural network is configured to proceed recursively such that:
      (1) for each iteration of the recursion, the neural network is configured to generate and output a representation of a candidate protein, if any, in complex with the constituent target complex,
      (2) for each iteration of the recursion, a representation of the complex of the generated candidate protein (the output of the iteration) and the constituent target complex (the input of the iteration) is passed back into the neural network as input for the next iteration of the recursion;
   c) using the trained neural network to obtain a representation of a candidate protein-protein complex, given a representation of a constituent target complex;
   d) synthesizing a constituent protein of the candidate protein-protein complex.

2. The method of claim 1, wherein the neural network is a transformer.

3. The method of claim 2, wherein during each iteration of the recursion, the representation of the generated candidate protein includes sequence, structure, and docking information.

4. The method of claim 3, wherein the transformer is multicapitate (has two or more heads) including a sequence head that generates the sequence and a structure head that generates the structure and docking representation of each output protein.

5. The method of claim 4, wherein the transformer architecture is encoder-decoder.

6. The method of claim 5, wherein embeddings of the constituent target complex structure and sequence are input into the encoder, and wherein the context array output of the final output layer of the encoder is input into the cross attention layers of the decoder.

7. The method of claim 6, wherein the sequence and structure representation of each constituent protein of the inferred protein-protein complex is generated via autoregression.

8. The method of claim 7, wherein the structure parameters are specified via voxels of a three dimensional grid in which the representative atom(s) of each amino acid residue is located.

9. The method of claim 8, wherein the structure head's loss function uses a penalty to exclude already occupied voxels from the distribution of probable voxels for the generated residue during any given iteration of the autoregression.

10. A method, as in the method of claim 9, for obtaining sequence, structure, and docking site representations of the constituent proteins of a protein-protein complex given a constituent target complex, and for synthesizing a constituent protein of the protein-protein complex, wherein the method is also for obtaining and synthesizing an effective ligand drug of a given target receptor, the method further comprising:
   a) obtaining for each of a plurality of candidate ligands, the given target receptor's sequence and structure representation when in complex with the candidate ligand;
   b) using the representation of each of the plurality of candidate conformations of the target receptor respectively as input into the transformer neural network; to obtain a respective candidate protein-protein complex associated with each candidate ligand;
   c) assessing, for each of the candidate protein-protein complexes, the biological activity and associated effectiveness;
   d) selecting the most effective candidate ligand based on the assessment;
   e) synthesizing the ligand.

11. A method, comprising:
   a) receiving, at a processor, representations of a plurality of antigen-antibody-protein complexes, wherein the plurality of antigen-antibody-protein complexes includes at least one of:
   i) a plurality of complexes of antigens and antibodies,
   ii) a plurality of complexes of antigen-antibody complexes and proteins,
   iii) a plurality of complexes of antigen-antibody complexes and protein complexes;
   b) using the representations of the plurality of antigen-antibody-protein complexes to train a neural network to obtain a representation of an antigen-antibody-protein complex, given a representation of a constituent target complex of that antigen-antibody-protein complex:
   ii) wherein the constituent target complex is an antigen or antigen-antibody-protein complex,
   iii) wherein an antigen-antibody-protein complex is any of the following:
      (1) a complex of an antigen and an antibody (i.e. an antigen-antibody complex),
      (2) a complex of an antigen-antibody complex and a protein,
      (3) a complex of an antigen-antibody complex and a protein complex,
   iv) wherein the neural network is configured to proceed recursively such that:
      (1) for each iteration of the recursion, the neural network is configured to generate and output a representation of a candidate protein, if any, in complex with the constituent target complex,
      (2) for each iteration of the recursion, a representation of the complex of the generated candidate protein (the output of the iteration) and the constituent target complex (the input of the iteration) is passed back into the neural network as input for the next iteration of the recursion;
   c) using the trained neural network to obtain a representation of a candidate antigen-antibody-protein complex, given a representation of a constituent target complex:

d) synthesizing a constituent protein of the generated antigen-antibody-protein complex representation.

12. The method of claim 11, wherein the neural network is a transformer.

13. The method of claim 12, wherein the transformer is multicapitate (has multiple heads) including a structure head which generates the structure and docking site representation, and a sequence head which generates the sequence of the output protein at each iteration.

14. A method, as in the method of claim 13, for generating an output antigen-antibody-protein complex given a constituent target complex and for synthesizing a constituent protein of the antigen-antibody-protein complex, wherein the method is also for obtaining and synthesizing an effective antibody given a peptide antigen, the method further comprising:
   a) receiving, at a processor, representations of a plurality of candidate antigens;
   b) generating a candidate antigen-antibody-protein complex for each candidate antigen; wherein for each generated candidate antigen-antibody-protein complex, a constituent antibody is synthesized as output;
   c) assessing the interaction efficacy and properties of the antigen and synthesized antibody of each of the plurality of candidate antigen-antibody-protein complexes;
   d) selecting, based on the interaction efficacies and properties, the most effective candidate antibody of the plurality of represented candidate antibodies.

15. The method of claim 14, wherein the antigen is an endogenous protein and the antibody is a synthetic biologic drug.

16. The method of claim 14, wherein the antigen is a component or product of a pathogen and the antibody is a monoclonal antibody (mAb) drug.

17. The method of claim 14, wherein the antigen is a component or product of a cancerous cell and the antibody is the antibody part of an Antibody Drug Conjugate (ADC).

18. A method, comprising:
   a) receiving, at a processor, representations of a plurality of protein-protein complexes;
   b) using the representations of the plurality of protein-protein complexes to train a neural network to obtain a representation of a protein-protein complex, given a representation of a constituent target complex of that protein-protein complex:
      i) wherein the constituent target complex is a protein or protein-protein complex,
      ii) wherein the neural network is configured to proceed recursively such that:
         (1) for each iteration of the recursion, the neural network is configured to generate and output a representation of a candidate protein, if any, in complex with the constituent target complex,
         (2) for each iteration of the recursion, a representation of the complex of the generated candidate protein (the output of the iteration) and the constituent target complex (the input of the iteration) is passed back into the neural network as input for the next iteration of the recursion;
   c) receiving, at a processor, a plurality of representations of a target protein, wherein each representation includes a representation of the structure of the target protein when in complex with one of a plurality of small molecule drug (SMD) candidate ligands;
   d) using the trained neural network to obtain a representation of a candidate protein-protein complex for each of the plurality of protein-SMD ligand complexes; wherein each candidate protein-protein complex output arises from using one of the plurality of protein-SMD complexes as input into the trained neural network;
   e) assessing the properties and efficacy of each the plurality of candidate protein-protein complexes and their constituent proteins;
   f) selecting, based on the assessment, the most effective small molecule drug;
   g) manufacturing the small molecule drug ligand.

19. The method of claim 18, wherein the neural network is a multicapitate transformer (a transformer with two or more heads), including a sequence head and a structure head, such that at each amino acid residue-generating iteration, the sequence head outputs the next residue in the sequence and the structure head outputs that residue's associated structure parameters.

20. The method of claim 18, wherein the selected candidate protein is a receptor.

* * * * *